Nov. 6, 1945.   J. C. BUECHEL   2,388,523
LUBRICANT HEATING SYSTEM FOR TURBOSUPERCHARGES AND THE LIKE
Filed June 3, 1942

Inventor:
Joseph C. Buechel,
by Harry E. Dunham
His Attorney.

Patented Nov. 6, 1945

2,388,523

UNITED STATES PATENT OFFICE 2,388,523

LUBRICANT HEATING SYSTEM FOR TURBO-SUPERCHARGERS AND THE LIKE

Joseph C. Buechel, Hollywood, Calif., assignor to General Electric Company, a corporation of New York Application June 3, 1942, Serial No. 445,590

4 Claims. (Cl. 184—6)

The present invention relates to lubricant heating systems and especially to lubricant heating systems for turbosuperchargers, although it is not limited thereto necessarily but may be used wherever found applicable.

The object of my invention is to provide an improved lubricant heating system which is simple in structure, reliable in operation and functions automatically.

For a consideration of what I believe to be novel and my invention, attention is directed to the following specification and the claims appended thereto.

Figure 1:
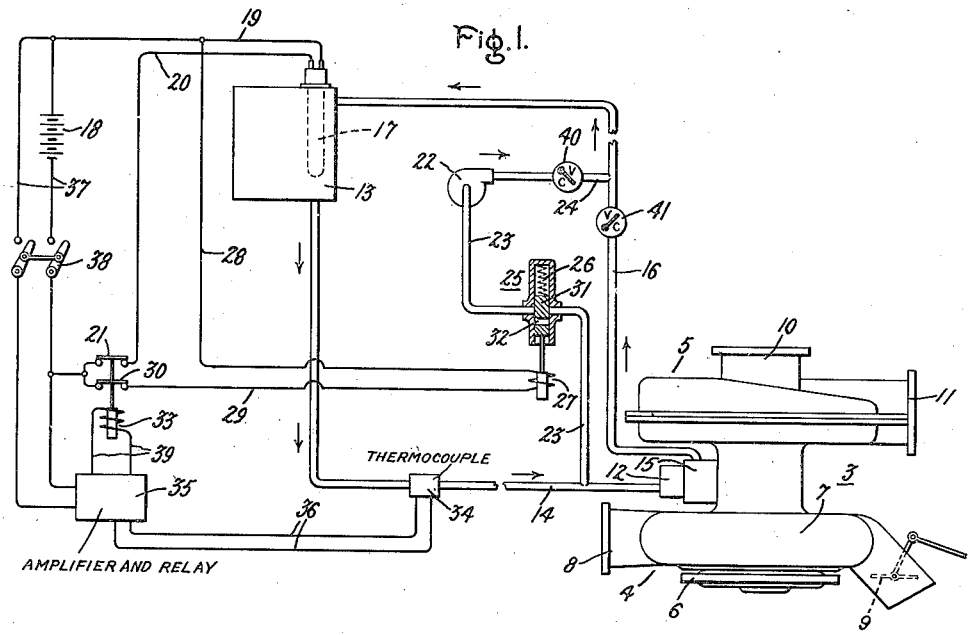
Figure 2:
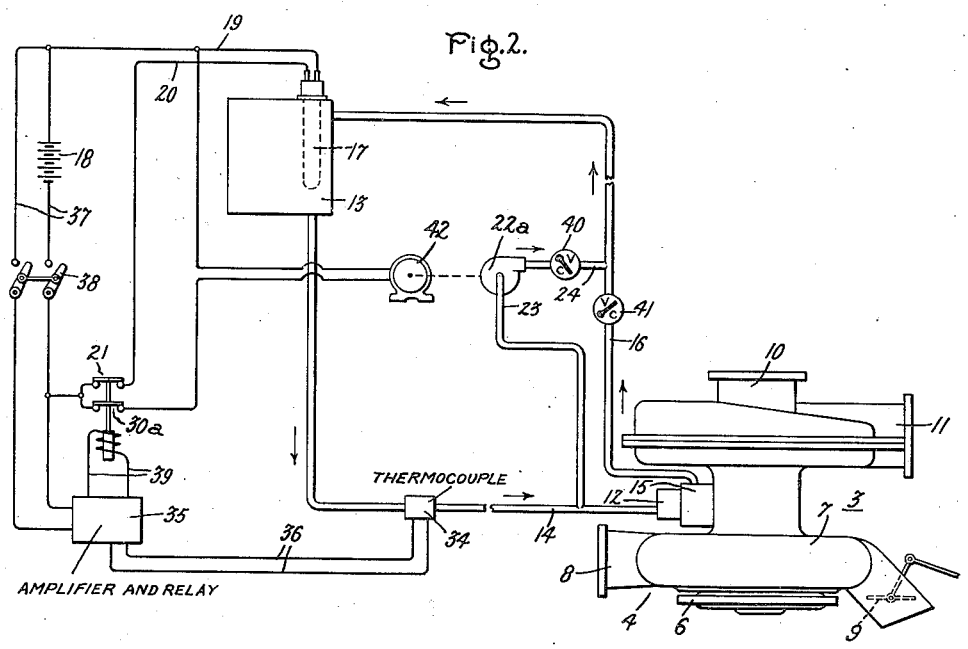

In the drawing, Fig. 1 is a diagrammatic view of a system embodying my invention, and Fig. 2 is a similar view of a modification.

Referring to the drawing, Fig. 1, 3 indicates a turbosupercharger comprising an exhaust gas driven turbine 4 and a compressor 5. The turbine wheel is indicated at 6, the nozzle box at 7, the exhaust gas inlet at 8, and the waste gate valve at 9. The compressor inlet is indicated at 10 and the compressor discharge is indicated at 11. Lubricant is supplied to the parts of the turbosupercharger requiring lubrication by a pressure oil pump 12 which has its inlet connected to a lubricant supply tank 13 by a pipe line 14. The pump 12 supplies lubricant through suitable passages to parts of the supercharger requiring lubrication. From such parts the lubricant flows to a suitable sump in the supercharger casing (not shown). The lubricant is returned from the sump to tank 13 by a scavenger pump 15 which has its discharge connected to tank 13 by a pipe line 16. The pressure and scavenger pumps may be driven from the turbosupercharger shaft through suitable gearing.

The structure so far described is a known one and is to be taken as typical of any turbosupercharger installation. In the case of an aircraft, the turbine 4 may be operated by exhaust gases from an aircraft engine. The compressor 5 may be used to supercharge an aircraft engine, a cabin, or for other purposes.

In installations of this type difficulty is experienced sometimes with the lubricant reaching such a low temperature that it does not flow readily. This condition may obtain in cold weather when the aircraft is on the ground. Also, it may occur when the aircraft is at a high altitude and the engine is temporarily shut down so that the supercharger ceases to operate for a short time, but a time long enough that the oil in the tank and in the pipe line may become cold.

According to the Fig. 1 embodiment of my invention, I provide in tank 13 a suitable electric heating unit 17 connected to a source of electrical energy 18 by conductors 19 and 20. In conductor 20 is an electric switch 21 which is normally open. When closed, it connects source 18 to heating unit 17. I then provide a pump 22, independent of pressure pump 12, for circulating the lubricant in tank 13 through the tank and the pipe lines 14 and 16, and provide means responsive to the temperature of the lubricant being circulated for controlling such circulation. In the arrangement shown in Fig. 1, pump 22 is a continuously running pump driven by any suitable means such as an electric motor, for example. It is connected in shunt to pump 12 by a suction or inlet pipe 23 which connects the inlet of pump 22 to pipe line 14, and by a discharge pipe 24 which connects the discharge side of pump 22 to pipe line 16. Pipes 23 and 24 are connected to pipe lines 14 and 16, respectively, at points adjacent to pressure pump 12 and scavenger pump 15. In pipe 23 is a normally closed valve 25 which is biased to closed position by a spring 26 and which is adapted to be opened against the action of spring 26 by a solenoid 27, the winding of which is connected to source 18 by conductors 28 and 29. In conductor 29 is a switch 30 which is normally open and which when closed energizes solenoid 27 to effect the opening of valve 25. Valve 25 may be of any suitable type. In the present instance, it is shown as comprising a valve body 31 which slides in the valve casing and has a passage 32 which is normally out of line with pipe 23 and is brought into line therewith when solenoid 27 is energized.

Switches 21 and 30 are closed by a solenoid 33 which is in circuit with a temperature responsive device 34 associated with pipe line 14.

Any suitable type of temperature responsive device may be used, the essential thing being that it effects a closing of switches 21 and 30 by solenoid 33 whenever the temperature of the oil in pipe line 14 is below a predetermined low value and effects opening of such switches when the temperature of oil in pipe line 14 is above such predetermined value. In the present instance, temperature responsive device 34 is indicated as being in the form of a thermocouple connected to solenoid 33 through the intermediary of a suitable amplifier and relay 35 which controls the connection between solenoid 33 and source 18. The input conductors between the thermocouple 34 and the amplifier and relay 35 are indicated at 36 and the power conductors between source 18 and the amplifier and relay 35 are indicated at 37. In conductors 37 is a hand switch 38. Solenoid 33 is connected to the output circuit of amplifier and relay 35 by conductors 39.

In pipe 24 is a non-return valve 40 which prevents flow of lubricant from pipe line 16 toward pump 22 and in pipe line 16 is a non-return valve 41 which prevents flow of lubricant through pipe line 16 toward pump 15.

In normal operation, hand switch 38 is closed so as to put power on the amplifier and relay 35. Now, if the temperature of the oil in pipe line 14 is below the desired low value, switch 21 connects heater element 17 to source 18 and switch 30 connects solenoid 27 to source 18. Pump 22 is a continuously running pump and when solenoid 27 is energized, valve 25 is actuated to open pipe 23 so that pump 22 circulates lubricant from tank 13 through pipe lines 14 and 16 back to the tank, the circulation being in shunt to pumps 12 and 15. By reason of the fact that pipes 23 and 24 are connected adjacent to pumps 12 and 15, circulation of lubricant takes place throughout substantially the entire pipe line. When the temperature of the lubricant in the system reaches a predetermined high value, thermocouple 34 effects operation of solenoid 33 to open switches 21 and 30, thus disconnecting heater 17 from source 18 and shutting off the suction inlet of pump 22 whereupon pump 22 will run idle.

In Fig. 2 is illustrated a modification similar to that shown in Fig. 1 except that pump 22ª, corresponding to pump 22 of Fig. 1, is operated by an electric motor 42, the circuit of which is controlled by a switch 30ª, corresponding to switch 30 of Fig. 1. Otherwise, the arrangement indicated in Fig. 2 is the same as that shown in Fig. 1 and corresponding reference characters have been used to indicate corresponding parts. With the arrangement shown in Fig. 2, pump 22ª is shut down when the lubricant has the desired high temperature rather than having its inlet closed, as shown in Fig. 1.

By my invention, I provide a system which is simple in structure and which operates automatically to maintain the lubricant in the system above a desired temperature.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, a turbosupercharger, a lubricant tank, pump means connected with said tank for conveying lubricant from the tank to turbosupercharger parts requiring lubrication and thence back to the tank, a second pump means in shunt to said first-named pump means for effecting circulation of lubricant from and back to the tank, a heating element in the tank, and means responsive to the temperature of the lubricant for controlling said heating element and the circulation of lubricant by said second pump means.

2. In combination, a turbosupercharger, lubricant pump means driven by the turbosupercharger, a lubricant tank, a suction pipe line and a return pipe line between said tank and said pump means, a second pump means in shunt to said first-named pump means for effecting circulation of lubricant through said tank and said pipe lines, a heater in said tank, and means controlled by the temperature of the oil for effecting operation of said second pump means and for controlling said heater.

3. In a mechanism subjected to low temperatures, the combination of a machine to be lubricated, a lubricating system for the machine comprising a lubricant supply tank, lubricant pump means, and a suction pipe line and a return pipe line connecting said tank to said pump means, a heater associated with said lubricating system, a second pump means in shunt to said first-named pump means, and means controlled by the temperature of the lubricant for controlling said second pump means and said heater.

4. In combination, a machine to be lubricated, a lubricant pump means driven by said machine, a lubricant tank, a suction pipe line and a return pipe line connecting the tank to said pump means, a pump connected in shunt to said lubricant pump means for effecting circulation of lubricant through said tank and pipe lines, an electric heater in said tank, and means controlled by the temperature of the lubricant for controlling circulation of lubricant by said pump and for controlling said electric heater.

JOSEPH C. BUECHEL.